United States Patent [19]
Malone

[11] Patent Number: 5,682,798
[45] Date of Patent: Nov. 4, 1997

[54] UNIVERSAL CORE TERMINAL

[75] Inventor: David Malone, Lapeer, Mich.

[73] Assignee: Teleflex Incorporated, Plymouth Meeting, Pa.

[21] Appl. No.: 640,090

[22] Filed: Apr. 30, 1996

[51] Int. Cl.⁶ ........................................ F16C 1/10
[52] U.S. Cl. ............... 74/502.6; 74/502.4; 74/501.5 R; 403/70
[58] Field of Search ................ 74/502.4, 500.5, 74/502.6; 403/61, 70, 122, 141, 120

[56] References Cited

U.S. PATENT DOCUMENTS

| | | | |
|---|---|---|---|
| 3,787,127 | 1/1974 | Cutler | 403/133 |
| 4,111,570 | 9/1978 | Morel | 403/18 |
| 4,118,131 | 10/1978 | Schnitzius | 403/24 |
| 4,499,785 | 2/1985 | Bennett et al. | 74/502.4 |
| 4,625,579 | 12/1986 | Spease | 74/501.5 R |
| 4,694,705 | 9/1987 | Frankhouse et al. | 74/502 |
| 4,947,704 | 8/1990 | Gokee | 74/502.4 |
| 5,265,495 | 11/1993 | Bung et al. | 74/502.6 |

*Primary Examiner*—Vinh T. Luong
*Attorney, Agent, or Firm*—Howard & Howard

[57] ABSTRACT

A terminal (24) on the end of the core element for attachment to a ball stud (26) and having a top (28) and bottom (30) and a hole extending between the top (28) and the bottom (30) for receiving the ball stud (26). The terminal (24) is characterized by three top fingers (32) disposed in the hole for engaging and retaining the ball stud (26) when inserted into the hole from the top (28) of the terminal (24) and three bottom fingers (34) disposed in the hole for engaging and retaining the ball stud (26) when inserted into the hole from the bottom (30) of the terminal (24). The top fingers (32) cross the bottom fingers (34) axially of the hole for the distal ends of top fingers (32) to engage a first shoulder (27) to prevent movement of the ball stud (26) in one axial direction and for the distal ends of the bottom fingers (34) to engage the bottom of the ball to prevent movement of the ball stud (26) in the opposite axial direction.

14 Claims, 2 Drawing Sheets

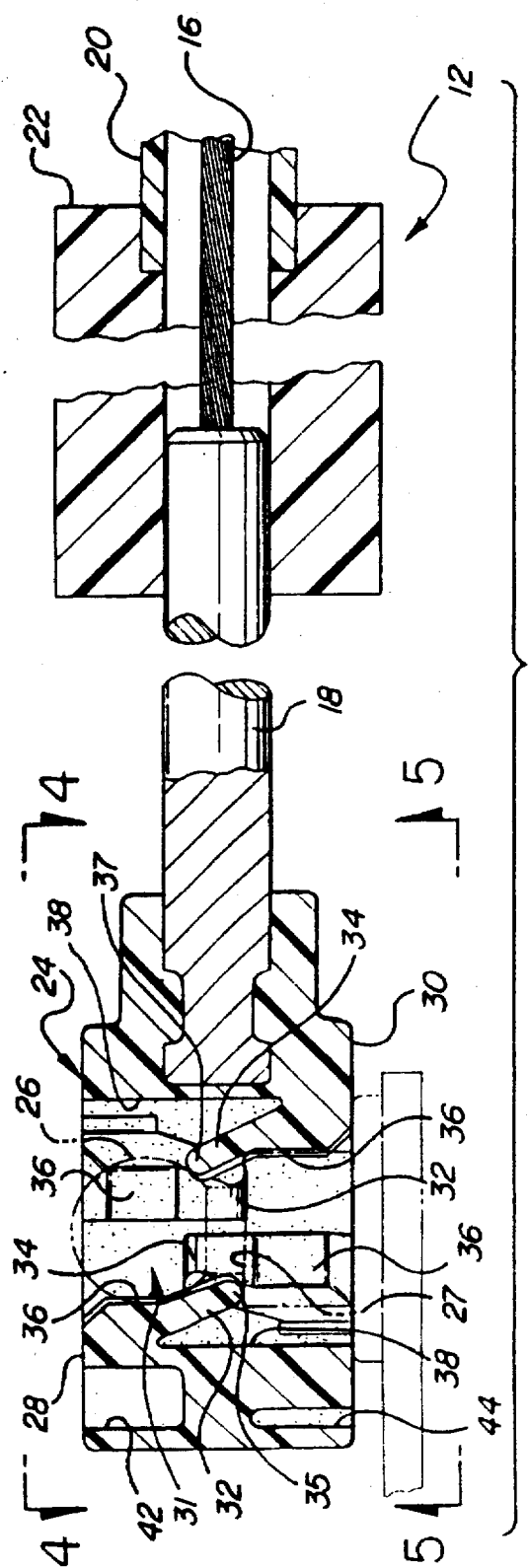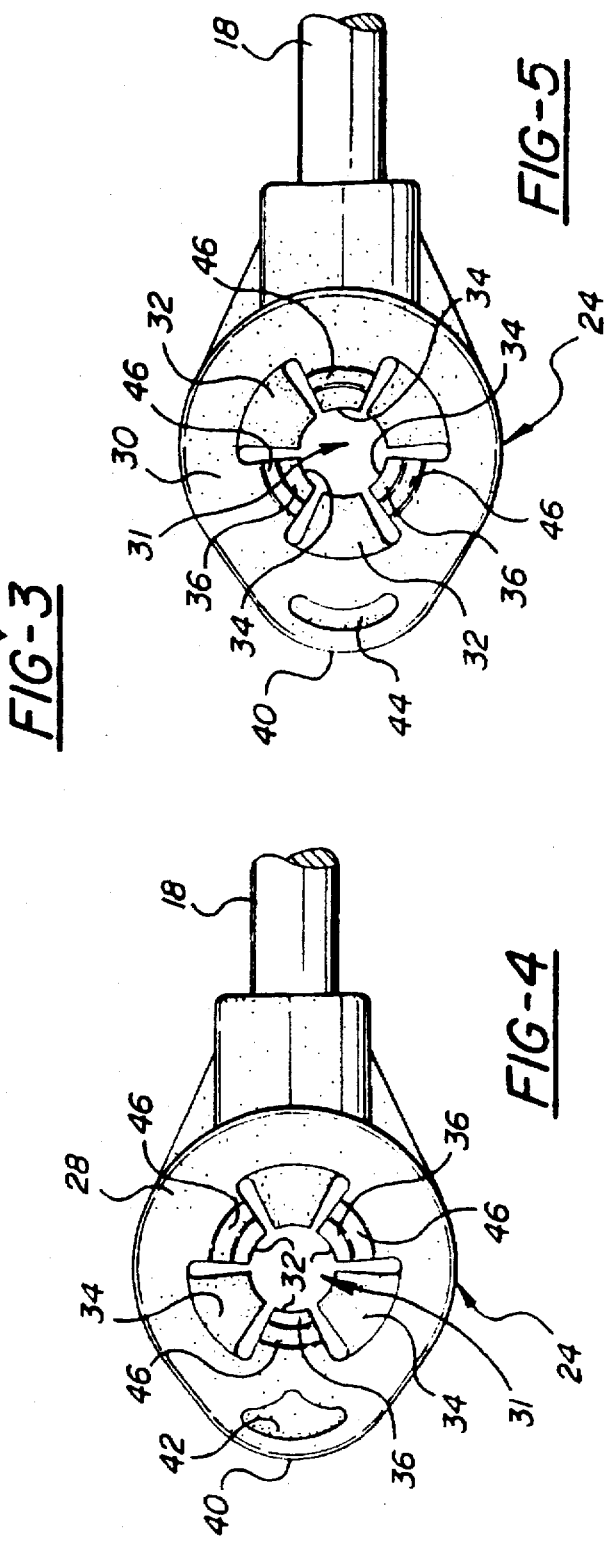

UNIVERSAL CORE TERMINAL

TECHNICAL FIELD

The subject invention relates to a motion transmitting remote control assembly of the type for transmitting motion in a curved path by a flexible motion transmitting core element and, more particularly, to a terminal on the end of the core element for attachment to the member to be controlled.

BACKGROUND OF THE INVENTION

The assemblies to which the subject invention relates are used extensively in the automotive industry. Typically, such a control assembly is routed through the vehicle from the instrument panel to a remote device to be controlled. As the conduit is routed in a curved or circuitous path through the vehicle with the conduit anchored to the vehicle support structure, the opposite ends of the core element are connected to the input and output control members. Plastic terminals are disposed on the ends of the core elements for attachment to a control element.

A wide variety of such terminals are known for connecting a motion transmitting core element to a member to be controlled and many are adapted to receive a spherical control member. However, a great deal of effort has been made to provide various designs which prevent the spherical member from entering the terminal from the wrong side. Notwithstanding such terminals, there remains the problem of the assembler inadvertently inserting the control member into the terminal from the wrong direction.

SUMMARY OF THE INVENTION AND ADVANTAGES

A motion transmitting remote control assembly of the type for transmitting motion in a curved path and comprising a flexible motion transmitting core element having a longitudinal axis and a terminal on the end of the core element for attachment to a control member and having a top and bottom. The terminal has a hole extending between the top and the bottom for receiving the control member and is characterized by at least one top finger disposed in the hole for engaging and retaining the control member when inserted into the hole from the top of the terminal and at least one bottom finger disposed in the hole for engaging and retaining the control member when inserted into the hole from the bottom of the terminal.

Accordingly, a control member may be inserted into the terminal from either the top or the bottom and be equally retained therein, thereby providing a universal terminal.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross sectional view taken substantially along line 3—3 of FIG. 1;

FIG. 4 is a top view of the terminal taken along 4—4 of FIG. 3; and

FIG. 5 is a bottom view of the terminal taken along line 5—5 of FIG. 3.

DETAILED DESCRIPTION OF THE PREFERRED EMBODIMENT

Figure 1:
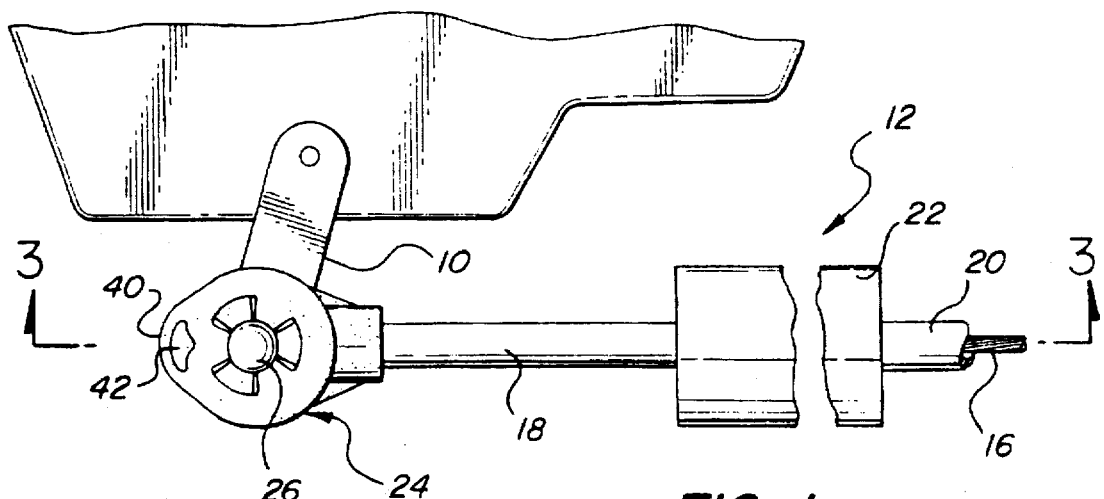
FIG. 1 is a fragmentary elevational view of a preferred embodiment.
Figure 2:
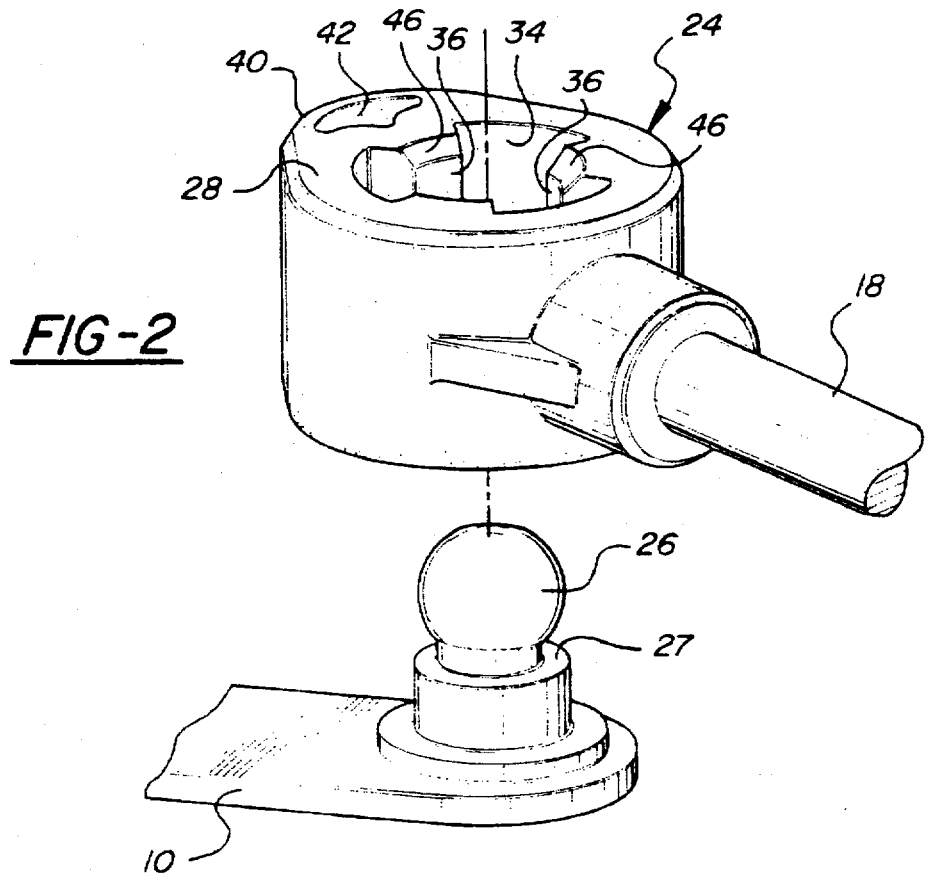
FIG. 2 is is an enlarged fragmentary perspective view in the preassembled condition.

Referring to the figures, wherein like numerals indicate like or corresponding parts throughout the several views, a motion transmitting remote control assembly of the type for transmitting motion in a curved path to move a control element 10 is generally shown at 12.

The assembly 12 includes a flexible motion transmitting core element 14 having a longitudinal axis. The core element comprises a flexible wire 16 and a rigid metal rod 18. A conduit 20 movably supports the core element and a fitting or ferrule 22 is disposed on the end of the conduit 20 for supporting the conduit to a support structure. The conduit is of the well type which includes an inner tubular member made of plastic surrounded by wires or filaments disposed helically on a long lead about the inner tubular member and encased in an extruded plastic casing. The fitting 22 is molded of a plastic material about the conduit 20 and slidably supports the rod 18 of the core element.

A terminal, generally indicated at 24 and molded of organic polymeric material, is disposed about the distal end of the rod 18 of the core element for attachment to the control member 10. More specifically, the control member 10 is a lever to actuate or move a device in an automobile and includes a ball stud 26 which attaches to the terminal 24. The ball stud 26 is defined by a spherical head supported on a shaft which extends from a circular base and forms a shoulder 27 therewith. The terminal 24 has a top surface 28 and a bottom surface 30 with a hole 31 extending between the top 28 and the bottom 30 for receiving the ball stud 26 of the control member 10.

The terminal 24 is characterized by at least one and preferably a plurality of top fingers 32 disposed in the hole for engaging and retaining the ball stud 26 when the ball stud 26 is inserted into the hole 31 from the top 28 of the terminal 24 and at least one and preferably a plurality of bottom fingers 34 disposed in the hole 31 for engaging and retaining the ball stud when the ball stud 26 is inserted into the hole 31 from the bottom 30 of the terminal 24. The top fingers 32 are alternately spaced among the bottom fingers 34 about the circumference of the hole 31, otherwise the top fingers 32 are identicle to the bottom fingers 34. Each top finger 32 is circumferentially spaced from the adjacent bottom fingers 34 on either side thereof. As best seen in FIG. 3, the fingers 32 and 34 extend into the hole 31 to distal ends 35 and 37 and the distal ends 35 of the top fingers 32 are spaced axially along the axis of the hole 31 from the distal ends 37 of the bottom fingers 34. The distal ends 35, 37 of the fingers are rounded. The top fingers 32 cross the bottom fingers 34 axially of the hole 31 for the distal ends 35 of top fingers 32 to engage the first shoulder 27 of the ball stud 26 to prevent movement of the ball stud in one axial direction (i.e., downwardly) and for the distal ends 37 of the bottom fingers 34 to engage a second shoulder defined by the bottom of the ball to prevent movement of the ball stud 26 in the opposite axial direction (i.e., upwardly). Alternatively, the distal ends 35 of the top fingers 32 can be spaced axially from the distal ends 37 of the bottom fingers 34 without the fingers crossing to engage opposite sides of the ball. Furthermore, other members with different shapes may be substituted for the ball stud.

The terminal 24 presents a plurality of small diameter wall sections 36 extending between the top 28 and down the top fingers 32 and, in a like manner, between the bottom 30 and up the bottom fingers 34. The terminal 24 also presents a plurality of large diameter wall sections 38 extending axially from the top 28 and behind the bottom fingers 34 and extending axially from the bottom 30 and behind the top fingers 32, as shown in FIG. 3. The large diameter wall sections 38 alternate circumferentially about the hole 31 with the small diameter wall sections 36 adjacent the top 28 and adjacent the bottom 30 with each of the small diameter sections 36 adjacent the top 28 being axially aligned with one of the large diameter wall sections 38 adjacent the bottom 30.

As best shown in FIGS. 4 and 5, the terminal 24 includes three of the top fingers 32 disposed about the top of the hole 31 and three of the bottom fingers 34 disposed about the bottom of the hole 31. A first of the top fingers 32 is aligned with the longitudinal axis of the rod 18 of the core element and a first of the bottom fingers 34 is aligned with the longitudinal axis of the rod 18 and is disposed diametrically on the opposite side of the hole 31 from the first top finger 32.

The terminal 24 includes a nose 40 disposed diametrically opposite to and axially aligned with the longitudinal axis of the rod 18 of the core element, and which nose 40 defines a top recess 42 extending thereinto from the top 28 and a bottom recess 44 extending thereinto from the bottom 30. The top recess 42 has a greater volume than the bottom recess 44 to compensate for the greater thickness because of the disposition of the radially aligned and adjacent first top finger 32.

Conical surfaces 46 are disposed at the intersections of the small diameter wall sections 36 and the top 28 and bottom 30 respectively.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (12) for transmitting motion in a curved path and comprising:
   a flexible motion transmitting core element having a longitudinal axis;
   a terminal (24) on the end of said core element and having a top (28) and bottom (30);
   said terminal (24) having a hole (31) extending between said top (28) and said bottom (30); and
   said terminal (24) including at least one top finger (32) extending into said hole (31) from said top (28) for engaging and retaining a control member (10) and at least one bottom finger (34) extending into said hole (31) in the opposite direction from said bottom (30) for engaging and retaining the control member (10) whereby a control member may be inserted into the hole (31) from the top (28) of said terminal (24) and retained therein or alternatively inserted into said hole (31) from the bottom (30) of said terminal (24) and retained therein.

2. An assembly as set forth in claim 1 wherein said top fingers (32) are alternately spaced among said bottom fingers (34) about said hole 31.

3. An assembly as set forth in claim 2 wherein each top finger (32) is circumferentially spaced from said adjacent bottom fingers (34) on either side thereof.

4. An assembly as set forth in claim 3 wherein said fingers (32, 34) extend into said hole to distal ends (35, 37), said distal ends (35) of said top fingers (32) being spaced axially along said hole (31) from said distal ends (37) of said bottom fingers (34).

5. An assembly as set forth in claim 4 wherein said top fingers (32) cross said bottom fingers (34) axially of said hole (31) for said distal ends (35) of top fingers (32) to engage a first shoulder (27) of the control member (10) to prevent movement of said control member (10) in one axial direction and for said distal ends (37) of said bottom fingers (34) to engage a second shoulder of the control member (10) to prevent movement of said control member (10) in the opposite axial direction.

6. An assembly as set forth in claim 4 wherein said terminal (24) presents a small diameter wall sections (36) extending between said top (28) and said top fingers (32) and between said bottom (30) and said bottom fingers (34).

7. An assembly as set forth in claim 6 wherein said terminal (24) presents a large diameter wall sections (38) extending axially from said top (28) and behind said bottom fingers (34) and extending axially from said bottom (30) and behind said top fingers (32).

8. An assembly as set forth in claim 7 wherein said large diameter wall sections (38) alternate circumferentially about said hole (31) with said small diameter wall sections (36) adjacent said top (28) and adjacent said bottom (30) with each of said small diameter wall sections (36) adjacent said top (28) being axially aligned with one of said large diameter wall sections (38) adjacent said bottom (30).

9. An assembly as set forth in claim 8 including three of said top fingers (32) disposed about the top (28) of said hole (31) and three of said bottom fingers (34) disposed about the bottom (30) of said hole (31).

10. An assembly as set forth in claim 9 wherein a first of said top fingers (32) is aligned with said longitudinal axis of said core element and a first of said bottom fingers (34) is aligned with said longitudinal axis of said core element and is disposed diametrically on the opposite side of said hole (31) from said first top finger (32).

11. An assembly as set forth in claim 10 wherein said terminal (24) includes a nose (40) axially aligned with said longitudinal axis of said core element and defining a top recess (42) extending thereinto from said top (28) and a bottom recess (44) extending thereinto from said bottom (30), said top recess (42) having a greater volume than said bottom recess (44), said first top finger (32) being adjacent and radially aligned with said top recess (42).

12. An assembly as set forth in claim 11 including conical surfaces (46) at the intersections of said small diameter wall sections (36) and said top (28) and said bottom (30) respectively.

13. An assembly as set forth in claim 12 including a conduit (20) movably supporting said core element.

14. An assembly as set forth in claim 13 wherein said core element includes a rigid rod (18), said terminal (24) being of organic polymeric material disposed about the end of said rod (18), said nose (40) being disposed diametrically opposite to said rod (18).

* * * * *